United States Patent [19]

McDonald et al.

[11] Patent Number: 4,466,662

[45] Date of Patent: Aug. 21, 1984

[54] POWERED ARTICULATED HEADREST SYSTEM

[75] Inventors: Alexander B. McDonald, Long Beach; Joseph T. Mannix, Seal Beach, both of Calif.

[73] Assignee: The United States of America as represented by the Secretary of the Air Force, Washington, D.C.

[21] Appl. No.: 320,893

[22] Filed: Nov. 12, 1981

[51] Int. Cl.³ .............................................. A47C 7/36
[52] U.S. Cl. .................................. 297/406; 297/408; 297/410; 297/391; 244/122 R; 244/122 AG
[58] Field of Search ............... 297/391, 408, 409, 410, 297/406, 407, 464; 5/437; 244/122 R, 122 A, 122 AG

[56] References Cited

U.S. PATENT DOCUMENTS

| | | | |
|---|---|---|---|
| 522,192 | 7/1894 | Browne | 297/407 |
| 2,719,577 | 10/1955 | Eyman | 297/391 |
| 2,920,848 | 1/1960 | Bohlin | 244/122 AG |
| 3,525,490 | 8/1970 | Duncan et al. | 244/122 |
| 3,730,589 | 5/1973 | Lane | 297/391 |
| 3,858,937 | 1/1975 | Norris | 297/408 |
| 3,885,831 | 5/1975 | Rasmussen | 297/410 |
| 3,922,034 | 11/1975 | Eggert | 297/216 |
| 4,130,318 | 12/1978 | Hemmen et al. | 297/391 |
| 4,205,878 | 6/1980 | Wooten | 297/391 |

FOREIGN PATENT DOCUMENTS 2932345 2/1981 Fed. Rep. of Germany ...... 297/410

Primary Examiner—William E. Lyddane
Assistant Examiner—Mark W. Binder
Attorney, Agent, or Firm—Donald J. Singer; Jacob N. Erlich

[57] ABSTRACT

A powered articulated headrest system for use with a seat structure having a backrest, such as the ejection seat of a high performance aircraft, e.g., a combat aircraft. The headrest system includes: a headrest assembly which is movably connected to the backrest; and, an electro-hydraulic actuator assembly for moving the headrest from an original (and normal) position above the backrest to any one of an infinite variety of positions which are rearward and downward of the headrest, and for moving the headrest from these other positions to the original position. The actuator assembly is controlled by the occupant of the seat, e.g., the pilot of the aircraft. When the headrest is moved rearwardly, unlike the prior art, the width of the headrest decreases thereby reducing any interference with aft visibility, and the height of the headrest also decreases thereby further reducing any interference with aft visibility and also eliminating any scrubbing action between the headrest and the head of the occupant of the seat.

8 Claims, 3 Drawing Figures

POWERED ARTICULATED HEADREST SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to a unique headrest and, more particularly, to a powered articulated headrest system for use with a seat structure.

The pilot of a combat aircraft requires good external visibility for surveillance and for tracking enemy aircraft. In current combat aircraft the pilot has to lean forward and twist around in order to see aft and upwards. It is anticipated that future combat aircraft will have manuever capabilities significantly greater than current aircraft. In combat conditions the pilot will be subjected to high acceleration forces and may be seated in a reclined posture to improve his tolerance to high acceleration. In those circumstances, the pilot will be physically unable to lean forward and twist around for aft and upward visibility.

Therefore, what is needed in the art, and is not presently available, is a headrest or a headrest system which will resolve the aforementioned problems by minimizing headrest obstruction to aft visibility, and by providing a means whereby the pilot can move his head against acceleration forces.

SUMMARY OF THE INVENTION

The instant invention fulfills the above-mentioned needs, and thereby constitutes a significant advance in the state-of-the-art, by providing a powered articulated headrest system wherein as the headrest pivots aft, the width of the headrest decreases thereby reducing any interference with aft visibility, and simultaneously the height of the headrest decreases thereby further reducing any interference with aft visibility and also eliminating any scrubbing action between the headrest and the pilot's head. It is here to be noted that, although the aeronautical terms "aircraft", "pilot", "aft" and the like have been used, the instant inventive powered articulated headrest system is for use with any seat structure; and, that the use of aeronautical terms is by way of illustration only, and not by way of any limitation. It is also to be noted, however, that the instant invention is ideally suited for use with a seat structure that is an ejection seat for a very high performance aircraft.

Accordingly, it is an object of the instant invention to provide an articulating headrest which performs the normal support function of a conventional headrest, such as an aircraft ejection seat headrest.

It is another object of this invention to provide the above-described headrest which, in addition, can be tilted backwardly to an aft (i.e., rearward) tilted position, where it will not interfere with head movement.

It is still another object of the instant invention to provide the above-described headrest which, as it pivots aft, the width of the headrest decreases, thereby reducing any interference with aft visibility.

It is a further object of this invention to provide the above-described headrest which, as it pivots aft, the height of the headrest also decreases, thereby further reducing any interference with aft visibility, and also eliminating any scrubbing action between the headrest and the head of the occupant of the seat (e.g., the pilot).

It is a still further object of the instant invention to provide means, operably associated with the headrest, for powering and moving the headrest, with the means being controllable by the seat occupant (e.g., the pilot). Thus, in the event that the headrest system is used with an aircraft ejection seat, the pilot can use the headrest to assist head motion. This is particularly important during high acceleration sustained turns, when the pilot will not be physically able to return his head to an upright position without assistance.

It is yet another object of this invention to provide a powered articulated headrest system in which the articulating headrest can be positioned at any point in its travel, and can therefore be adjusted for optimum comfort of the seat occupant during extended periods (e.g., the pilot during a long, but routine, flight).

It is yet a further object of the instant invention that, in the event the invention is used with an aircraft ejection seat, the articulating headrest can be powered to the upright position for head support against ejection and windblast forces.

These objects of the instant invention, as well as other objects related thereto, will become readily apparent after a consideration of the description of the invention, together with reference to the contents of the Figures of the drawing.

DESCRIPTION OF THE PREFERRED EMBODIMENT

Figure 1:
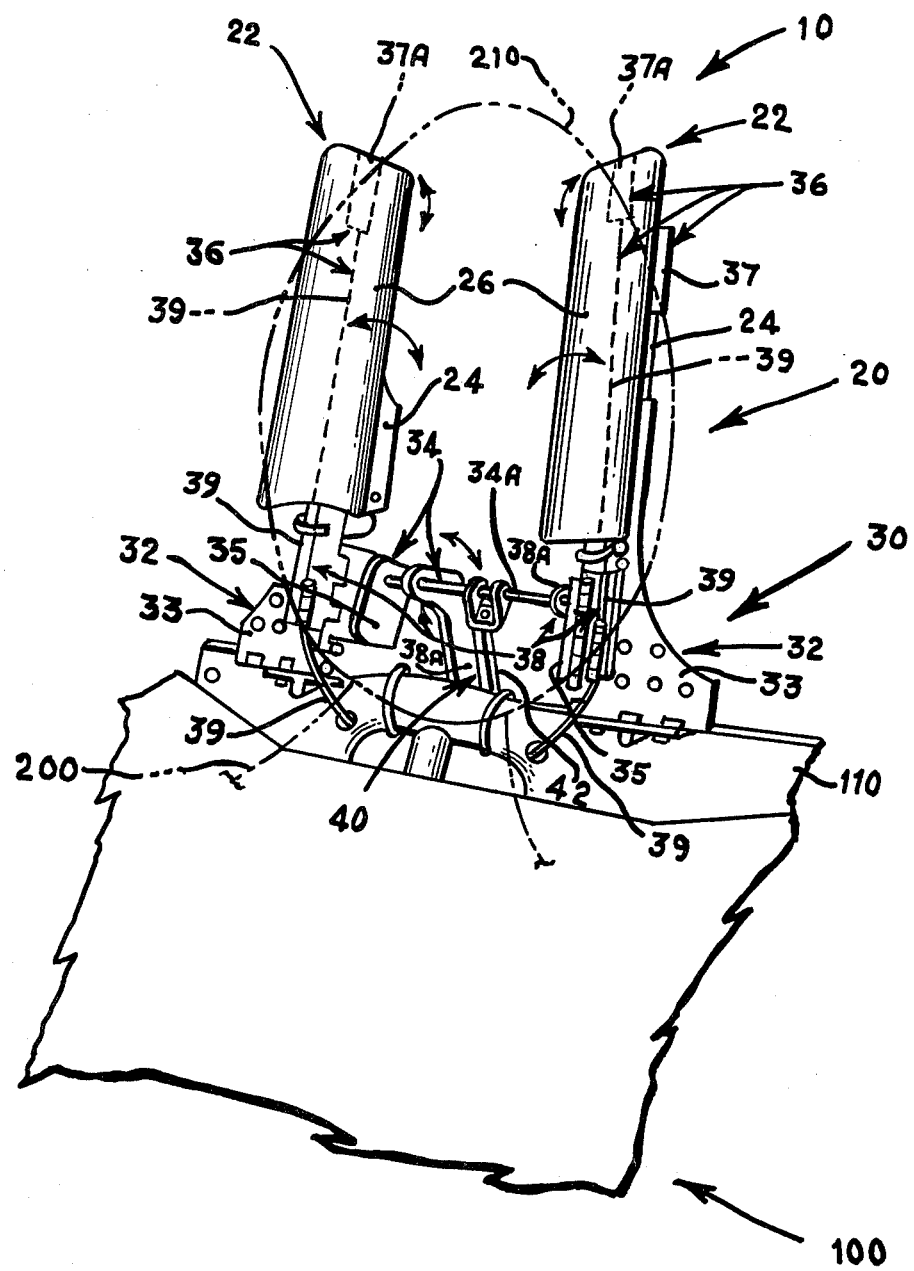
FIG. 1 is a perspective view, in simplified pictorial and schematic form, of the head support means, which is a constituent portion of the preferred embodiment of the instant invention, and which is shown in its working environment, i.e., movably connected to the backrest of a seat structure.
Figure 2:
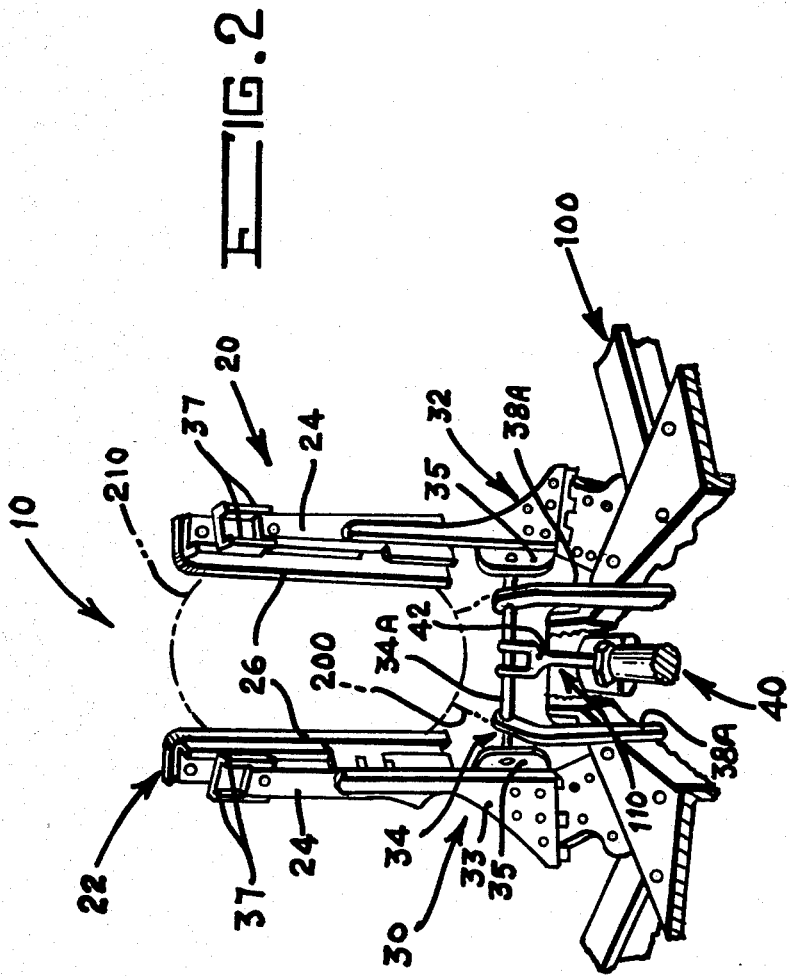
FIG. 2 is a rear view, in simplified pictorial and schematic form, of the head support means shown in FIG. 1.
Figure 3:
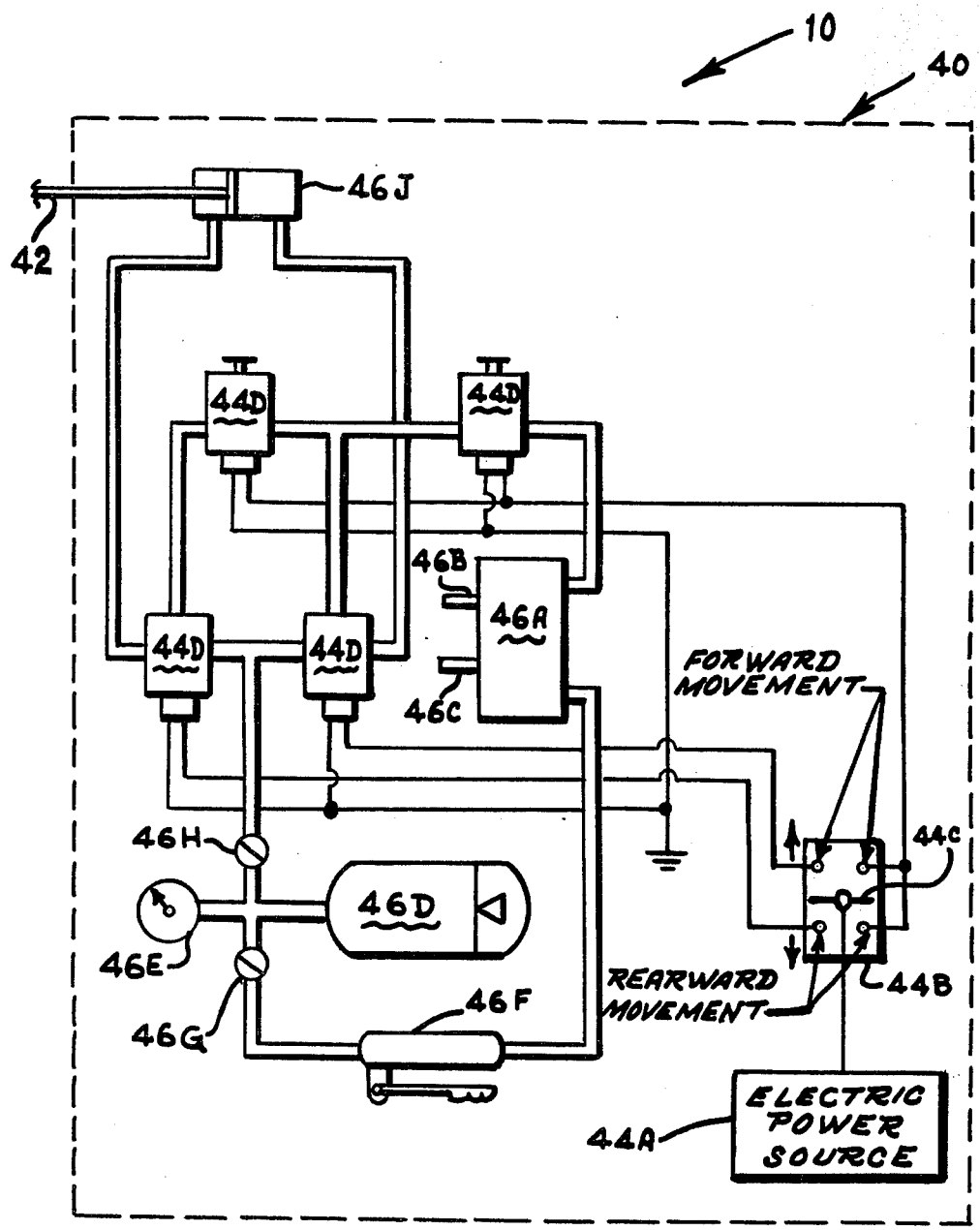
FIG. 3 is a schematic representation of the electro-hydraulic actuator means, which is a constituent portion of the instant invention, for selectively moving the head support means shown in FIGS. 1 and 2.

As a preliminary matter, it is to be remembered that the instant invention 10, FIGS. 1–3, inclusive, is a powered articulated headrest system intended for use with a seat structure (such as 100, FIGS. 1–3) having a backrest (such as 110, FIGS. 1–3).

With reference to FIGS. 1–3, inclusive, the preferred embodiment 10 of the instant invention comprises, in the most basic and generic structural form: a means 20 for supporting the head 210 of an occupant 200 of the seat structure 100, with the head support means 20 movably connected by suitable means to the backrest 110 at an original (or normal) position above the backrest; and a means 30, which is operably associated with the head support means 20, for selectively moving the head support means 20 from the original position above the backrest 110 to another position which is located rearwardly of the backrest 110, downwardly from the backrest 110, and inwardly toward the seat occupant's head 210. This means 30 is also for selectively moving the head support means 20 from this secondary rearward position forwardly to the original position above the backrest 110. This means 30 is controllable by the seat occupant 200; and, as a result, the seat occupant 200 can move the head support means 20 to a plurality of positions rearward and downward of the backrest 110, without obscuring his (or her) vision.

The head support means 20 includes a plurality of headrest pad assemblies 22 attached to and extending upwardly from the backrest 110, with each assembly 22 including a post 24, and a headrest pad 26 that is movably mounted on its respective post 24.

The means 30 for moving the head support means 20, includes: means 32 for pivotally connecting each post 24 in a skewed positional relationship to the backrest 110; means 34, operably associated with the means 32 for pivotally connecting each post, for interconnecting the plurality of posts 24; means 36 for slidably moving each headrest pad 26 along its corresponding post 24; means 38, operably associated with the means 36 for slidably moving each headrest pad 26, for interconnecting the plurality of headrest pads 26; and actuator means 40, operably associated with the means 34 for interconnecting the plurality of posts 24 and also operably associated with the means 38 for interconnecting the plurality of headrest pads 26, for imparting motion to both of the interconnecting means 34 and 38.

As a result of the structure and use of means 30 for moving the head support means 20, the posts 24 are pivotally movable rearwardly and downwardly of the backrest 110; the headrest pads 26 are movable downwardly along their respective posts 24; and, the posts 24 with the headrest pads 26 thereon are movable inwardly toward each other. It is here to be noted that all of the aforesaid movements are in one continuous motion. It is here also to be noted that, as a result of these movements, the height of the head support means 20 decreases, and the width of the head support means 20 also decreases. Of course, all of these movements are reversible, with opposite results being thereby attained.

More specifically, and as a matter of preference and not of limitation:

The means 32 for pivotally connecting each post 24 in a skewed positional relationship to the backrest (as best seen in FIG. 1) includes a hinge 33 for each post 24, with each hinge 33 disposed in a skewed position and pivotally interconnecting its corresponding post 24 to the backrest 110.

The means 34 for interconnecting the plurality of posts 24 comprises a rod 34A connected to hinged levers 35 that are connected to the posts 24. It is here to be noted that actuator rod 42 of actuator means 40 is also connected to rod 34A.

The means 36 for slidably moving each headrest pad 26 along its corresponding post 24 includes rails 37 (best seen in FIG. 2) attached to its headrest pad 26 and slidably engaging the post 24, and a biasing means 37A (such as a bungee cord, and best seen in FIG. 1) for biasing the headrest pad 26 away from the backrest 110.

The means 38 for interconnecting the plurality of headrest pads 26 includes for each headrest pad 26: a lever 38A pivotable from a position rearward of the backrest 110 and rotatable by the actuator means 40; and, means 39 for interconnecting the lever 38A to the biasing means 37A of that lever's respective headrest pad 26. The actuator means 40 is connected to the rod 34A of the means 34 for interconnecting all posts 24, and it 40 is also connected to the pivotable levers 38A of the means 38 for interconnecting all headrest pads 26.

Also more specifically, and as a matter of preference: the posts 24 are two (2) in number; the headrest pads 26 are two (2) in number; the skewed hinges 33 are two (2) in number; the hinged levers 35 are two (2) in number and are disposed at each end of the rod 34A which interconnects the posts 24; the pivotable levers 38A are two (2) in number; the means 39 for interconnecting each pivotable lever 38A to the biasing means 37A of that lever's respective headrest pad 26 comprises a cable; and the actuator means 40 is an electro-hydraulic means, as is shown in FIG. 3, which includes an actuator rod 42, FIGS. 1–3, as previously mentioned.

With reference to FIG. 3 and to the aforementioned actuator means 40, this electro-hydraulic means 40 is shown in FIG. 3 in a schematic representation. The means 40 comprises an electric circuit, a hydraulic system (or circuit) operably associated with the electric circuit, and other constituent components in connection therewith, all of which are in combination and, as desired by the seat occupant 200, FIGS. 1 and 3, selectively impart motion to means 34 (for interconnecting the plurality of posts 24) and to means 38 (for interconnecting the plurality of headrest pads 26). More specifically, the electric circuit includes: a source of electric power 44A; a headrest actuator switch 44B (with switch plate 44C) in electrical connection with the electric power source 44A, wherein the switch 44B is preferably a double-pole, center-off, momentary-on switch; and, a plurality of electro-hydraulic control valves 44D in electrical connection with the switch 44B. The operably associated hydraulic system includes: a reservoir 46A, with a relief valve 46B and an air valve 46C; an accumulator 46D (with a pressure gage 46E connected thereto) in connection with the reservoir 46A; a pump 46F (preferably of the hand type) interposed between, and connected to, the reservoir 46A and the accumulator 46D; a shut-off valve 46G interposed between, and connected to, the pump 46F and the accumulator 46D; the plurality of previously mentioned electro-hydraulic control valves 44D (which are common to both the electrical circuit and to the hydrualic system) interposed between, and connected to, the accumulator 46D and the reservoir 46E; a shut-off valve 46H interposed between, and connected to, the accumulator 46D and the electro-hydraulic control valves 44D; and, an actuation cylinder 46J (with an actuator rod 42) interposed between, and connected to, two of the electro-hydraulic control valves 44D.

MANNER OF OPERATION OF THE PREFERRED EMBODIMENT

The manner of operation, and of use, of the preferred embodiment 10, FIGS. 1–3, of the instant invention can be easily ascertained by any person of ordinary skill in the art from the foregoing description, coupled with reference to the contents of the Figures of the drawing.

For others, the following structural features, and resultant movement by use of, are highlighted to further simplify understanding the operation and use of the invention 10, FIGS. 1–3: the hinges 33, FIGS. 1 and 2, are skewed so that the tops of the posts 24, FIGS. 1 and 2, move inboard (i.e., inward, toward each other), as the posts 24 pivot aft (i.e., rearward); during forward pivoting of the headrest 22, the headrest pads 26 move up the rails 37 due to the force in the biasing means 37A; and, with the type of switch 44B, FIG. 3, used (i.e., a double-pole, center-off, momentary-on switch), the headrest motion only occurs while the switch selection (forward or backward) is held, and the switch 44B can be released to stop the headrest 22 in any desired position.

CONCLUSION

It is abundantly clear from all of the foregoing, and from the contents of the Figures of the drawing, that the stated objects of the instant invention 10, as well as other objects related thereto, have been achieved.

It is to be noted that, although there have been described and shown the fundamental and unique features of the instant invention, as applied to a preferred embodiment 10, nevertheless various other embodiments, variations, adaptations, substitutions, additions, omissions, and the like may occur to and can be made by those of ordinary skill in the art.

What is claimed is:

1. A powered headrest system for use with a seat structure having a backrest, wherein said headrest system comprises:
   a. means for supporting the head of an occupant of said seat structure, wherein this head support means is movably connected to said backrest and is originally positioned above said backrest, and wherein this means includes a plurality of headrest pad assemblies attached to and extending upwardly from said backrest, and also wherein each of said headrest pad assemblies includes a post, and a headrest pad mounted on said post; and
   b. means, operably associated with said head support means, for selectively moving said head support means from said original position to another position located rearwardly of said backrest, downwardly from said backrest, and inwardly toward said seat occupant's head, and for selectively moving said head support means from said other position forwardly to said original position, wherein this means for selectively moving said head support means is controllable by said seat occupant and includes:
      (1) means for pivotally connecting each post in a skewed relationship to said backrest;
      (2) means, operably associated with said means for pivotally connecting each post, for interconnecting said plurality of posts;
      (3) means for slidably moving each headrest pad along its corresponding post;
      (4) means, operably associated with said means for slidably moving each headrest pad, for interconnecting said plurality of headrest pads; and
      (5) actuator means, operably associated with said means for interconnecting said plurality of posts and also operably associated with said means for interconnecting said plurality of headrest pads, for imparting motion to both of these interconnecting means;
   whereby said seat occupant can move said head support means to a plurality of positions rearward and downward to said backrest without obscuring his vision; and
   whereby said posts are pivotally movable rearwardly and downwardly of said backrest, said headrest pads are movable downwardly along said posts, and said posts with said headrest pads thereon are movable inwardly toward each other, with all said movements being in one continuous motion; and
   thereby said height of said head support means decreases, and said width of said head support means also decreases.

2. A powered articulated headrest system, as set forth in claim 1, wherein said means for pivotally connecting each post in a skewed positonal relationship to said backrest includes a hinge for each post, with each hinge disposed in a skewed position and pivotally interconnecting its corresponding post to said backrest.

3. A powered articulated headrest system, as set forth in claim 2, wherein said means for interconnecting said plurality of posts comprises a rod connected to hinged levers that are connected to said posts.

4. A powered articulated headrest system, as set forth in claim 3, wherein said means for slidably moving each headrest pad along its corresponding post includes rails attached to said headrest pad and slidably engaging said post, and a biasing means for biasing said headrest pad away from said backrest.

5. A powered articulated headrest system, as set forth in claim 4, wherein said means for interconnecting said plurality of headrest pads includes for each headrest pad: a lever pivotable from a position rearward of said backrest and rotatable by said actuator means; and, means for interconnecting said lever to said biasing mean of that lever's respective headrest pad.

6. A powered articulated headrest system, as set forth in claim 5, wherein said actuator means is connected to said rod of said posts interconnecting means, and to said pivotable levers of said headrest pads interconnecting means.

7. A powered articulated headrest system, as set forth in claim 6, wherein:
   a. said posts are two in number;
   b. said headrest pads are two in number;
   c. said skewed hinges are two in number;
   d. said hinged levers, of said means for interconnecting said plurality of posts, are two in number and are disposed at each end of said rod;
   e. said pivotable levers, of said means for interconnecting said plurality of headrest pads, are two in number;
   f. said means for interconnecting each pivotable lever to said biasing means of that lever's respective headrest pad comprises a cable; and
   g. said actuator means is an electro-hydraulic means.

8. A powered articulated headrest system, as set forth in claim 7, wherein said electro-hydraulic actuator means includes:
   a. an electric circuit which further includes a double-pole, center-off, momentary-on switch in said circuit;
   b. a hydraulic circuit operably associated with said electric circuit; and
   c. a plurality of electro-hydraulic control valves common to said electric circuit and to said hydraulic circuit.

* * * * *